United States Patent
Uemura et al.

(10) Patent No.: US 12,294,327 B2
(45) Date of Patent: May 6, 2025

(54) ELECTROMAGNETIC BRAKE CONTROL DEVICE AND CONTROL DEVICE

(71) Applicant: OMRON Corporation, Kyoto (JP)

(72) Inventors: Takao Uemura, Kusatsu (JP); Ryuichi Jimbo, Kusatsu (JP); Masakazu Matsugami, Ritto (JP)

(73) Assignee: OMRON CORPORATION, Kyoto (JP)

( * ) Notice: Subject to any disclaimer, the term of this patent is extended or adjusted under 35 U.S.C. 154(b) by 1057 days.

(21) Appl. No.: 17/285,658

(22) PCT Filed: Nov. 7, 2019

(86) PCT No.: PCT/JP2019/043724
§ 371 (c)(1),
(2) Date: Apr. 15, 2021

(87) PCT Pub. No.: WO2020/110652
PCT Pub. Date: Jun. 4, 2020

(65) Prior Publication Data
US 2021/0399659 A1    Dec. 23, 2021

(30) Foreign Application Priority Data
Nov. 28, 2018 (JP) ................................. 2018-222608

(51) Int. Cl.
| | |
|---|---|
| H02P 3/04 | (2006.01) |
| F16D 63/00 | (2006.01) |
| G05B 9/03 | (2006.01) |
| F16D 121/18 | (2012.01) |
| F16D 121/20 | (2012.01) |
| H02P 29/024 | (2016.01) |

(52) U.S. Cl.
CPC .............. *H02P 3/04* (2013.01); *F16D 63/002* (2013.01); *G05B 9/03* (2013.01); *F16D 2121/18* (2013.01);
(Continued)

(58) Field of Classification Search
CPC ........ H02P 3/04; H02P 29/024; F16D 63/002; F16D 2121/18; F16D 2121/20; G05B 9/03
See application file for complete search history.

(56) References Cited

U.S. PATENT DOCUMENTS

| | | |
|---|---|---|
| 2002/0060894 A1 | 5/2002 | Horibata et al. |
| 2017/0211640 A1 | 7/2017 | Pearce et al. |
| 2017/0327093 A1 | 11/2017 | Fujiwara |

FOREIGN PATENT DOCUMENTS

| | | |
|---|---|---|
| CN | 1652464 A | 8/2005 |
| CN | 104247249 A | 12/2014 |

(Continued)

OTHER PUBLICATIONS

International Search Report issued in Intl. Appln. No. PCT/JP2019/043724 mailed Feb. 4, 2020. English translation provided.
(Continued)

*Primary Examiner* — Loren C Edwards
(74) *Attorney, Agent, or Firm* — ROSSI, KIMMS & McDOWELL LLP

(57) ABSTRACT

An electromagnetic brake controller for controlling a negative-actuated electromagnetic brake includes an output terminal connectable to the electromagnetic brake and a brake control section that outputs, through the output terminal, a brake control signal to be provided to the electromagnetic brake. The brake control section outputs a brake control signal for releasing the electromagnetic brake in response to a normal brake command and a safety brake command both indicating ON and outputs a brake control signal for applying the electromagnetic brake in response to at least one of the normal brake command or the safety brake command indicating OFF. The electromagnetic brake controller per-
(Continued)

forms both safety control and normal control over the electromagnetic brake connected to the output terminal.

4 Claims, 4 Drawing Sheets

(52) U.S. Cl.
CPC ........ *F16D 2121/20* (2013.01); *H02P 29/024* (2013.01)

(56) References Cited

FOREIGN PATENT DOCUMENTS

| CN | 108859780 A | | 11/2018 | |
|---|---|---|---|---|
| EP | 2899871 A1 | | 7/2015 | |
| JP | H06165546 A | | 6/1994 | |
| JP | 2000060173 A | | 2/2000 | |
| JP | 2003195901 A | | 7/2003 | |
| JP | 2011105455 A | * | 6/2011 | ............. B66B 1/32 |
| JP | 2012006683 A | | 1/2012 | |
| JP | 5885005 B2 | | 3/2016 | |
| WO | 9963643 A1 | | 12/1999 | |
| WO | 2014045728 A1 | | 3/2014 | |

OTHER PUBLICATIONS

Written Opinion issued in Intl. Appln. No. PCT/JP2019/043724 mailed Feb. 4, 2020. English translation provided.
Office Action issued in Chinese Appln. No. 201980069751.X, mailed Dec. 5, 2023. English machine translation provided.

* cited by examiner

ELECTROMAGNETIC BRAKE CONTROL DEVICE AND CONTROL DEVICE

TECHNICAL FIELD

The present invention relates to an electromagnetic brake controller for controlling a negative-actuated electromagnetic brake and a control apparatus for controlling the on-off state of power to a control target.

BACKGROUND

A typical servo driver can control an electromagnetic brake in accordance with a safety brake command and a normal brake command.

A safety brake command is an on-off command output from a safety output device to start and stop the electromagnetic brake. As shown schematically in FIG. 1, the servo driver includes a safety control unit 50 that starts and stops an electromagnetic brake 60 in accordance with a safety brake command. The safety control unit 50 includes a switch circuit 52 for turning on and off the power from a safety brake power supply (not shown) to an electromagnetic brake 60A, and a controller 51 for turning on and off the switch circuit 52 in response to an on-off control signal. The switch circuit 52 includes two switches on a current path from the safety brake power supply (not shown) to the electromagnetic brake 60A. More specifically, the switch circuit 52 includes one switch that can turn off power to the electromagnetic brake 60A when the other switch is broken while the electromagnetic brake 60 is being applied. The controller 51 in the safety control unit 50 diagnoses the state of the safety control unit 50 (the switch circuit 52 and the controller 51) based on a signal indicating the on or off state of the switch circuit 52. When diagnosing the safety control unit 50 as being in an abnormal state, the controller 51 turns off the power to the electromagnetic brake 60A.

The servo driver also includes a switch 54 for turning on and off the power from a normal brake power supply (not shown) to an electromagnetic brake 60B, and a controller 53 for turning on and off the switch 54. In response to an on-off command for a servo motor (servo-on/off command in the figure), for example, the controller 53 outputs a normal brake command for applying or releasing the electromagnetic brake 60B.

A known control system for an electromagnetic brake with self-diagnosis is described in the literature below.

CITATION LIST

Patent Literature

Patent Literature 1: Japanese Patent No. 5885005

SUMMARY

Technical Problem

As described above, the known servo driver includes one section for controlling the electromagnetic brake 60A in accordance with a safety brake command, and the other section for controlling the electromagnetic brake 60B in accordance with a normal brake command. These two sections are fully independent of each other. To change such control over the electromagnetic brake in the known servo driver from control in accordance with a safety brake command (hereafter, safety control) to control in accordance with a normal brake command (hereafter, normal control), or from normal control to safety control, the electromagnetic brake is to be reconnected. The structure using both safety control and normal control has many connection targets, and thus involves many maintenance man-hours.

In response to the above issue, one aspect of the present invention is directed to an electromagnetic brake controller that performs both safety control and normal control over an electromagnetic brake connected to an output terminal.

Another aspect of the present invention is directed to a control apparatus that performs both safety control and normal control over a control target connected to an output terminal for which the on-off state of power is to be controlled.

Solution to Problem

An electromagnetic brake controller according to an aspect of the present invention is a controller for controlling a negative-actuated electromagnetic brake. The controller includes an output terminal connectable to the electromagnetic brake, and a brake control section that outputs, through the output terminal, a brake control signal to be provided to the electromagnetic brake. The brake control section outputs a brake control signal for releasing the electromagnetic brake in response to a normal brake command and a safety brake command both indicating ON and outputs a brake control signal for applying the electromagnetic brake in response to at least one of the normal brake command or the safety brake command indicating OFF.

The electromagnetic brake controller with the above structure can perform both safety control and normal control over the electromagnetic brake connected to the output terminal. This structure has fewer connection targets, and thus involves fewer maintenance man-hours.

An electromagnetic brake controller according to another aspect of the present invention is a controller for controlling a negative-actuated electromagnetic brake. The controller includes an output terminal connectable to the electromagnetic brake, a brake power disconnect switch that connects and disconnects between a power supply for the electromagnetic brake connected to the output terminal and an internal brake power supply, a normal calculator that outputs, in response to a normal brake command indicating ON, a normal brake control signal to control the brake power disconnect switch to be on, and outputs, in response to the normal brake command indicating OFF, the normal brake control signal to control the brake power disconnect switch to be off, a first output switch and a second output switch each connected to the output terminal and the internal brake power supply to form a current path to allow a current to flow from the internal brake power supply to the electromagnetic brake in response to the first output switch and the second output switch being on, a first safety calculator that outputs, in accordance with a safety brake command, a first safety brake control signal to control an on-off state of the first output switch and detects a failure in the second output switch, and a second safety calculator that outputs, in accordance with the safety brake command, a second safety brake control signal to control an on-off state of the second output switch and detects a failure in the first output switch. In response to the brake power disconnect switch being controlled to be on, the first safety calculator in the electromagnetic brake controller operates in a first safety control state to monitor the second output switch for a failure and enters, upon detecting a failure in the second output switch, a first resetting state in which the first safety calculator continues to output the first safety brake control signal to control the first output switch to be off until a predetermined resetting operation is performed on the electromagnetic brake controller. In response to the brake power disconnect switch being controlled to be off, the first safety calculator operates in a first normal control state of being unable to detect a failure in the second output switch or being unable to enter the first resetting state in response to a failure detected in the second output switch. In response to the brake power disconnect switch being controlled to be on, the second safety calculator in the electromagnetic brake controller operates in a second safety control state to monitor the first output switch for a failure and enters, upon detecting a failure in the first output switch, a second resetting state in which the second safety calculator continues to output the second safety brake control signal to control the second output switch to be off until the predetermined resetting operation is performed. In response to the brake power disconnect switch being controlled to be off, the second safety calculator operates in a second normal control state of being unable to detect a failure in the first output switch or being unable to enter the second resetting state in response to a failure detected in the first output switch.

In other words, the electromagnetic brake controller with the above structure applies the electromagnetic brake in response to the brake power disconnect switch disconnecting power supply to the internal brake power supply. Thus, each safety calculator with the same structure as a known safety calculator may detect a failure in each output switch and may enter the resetting state in which the electromagnetic brake cannot be released in response to a normal brake command. However, when the brake power disconnect switch is controlled to be off, the first safety calculator in the electromagnetic brake controller operates in the first normal control state of being unable to detect a failure in the second output switch or being unable to enter the first resetting state in response to any failure detected in the second output switch. When the brake power disconnect switch is controlled to be off, the second safety calculator in the electromagnetic brake controller operates in the second normal control state of being unable to detect a failure in the first output switch or being unable to enter the second resetting state in response to any failure detected in the first output switch. The electromagnetic brake controller can thus perform both safety control and normal control over the electromagnetic brake connected to the output terminal.

Each safety calculator may use any method to determine whether the brake power disconnect switch is controlled to be on. For example, the first safety calculator and the second safety calculator may each determine, based on the normal brake control signal, whether the brake power disconnect switch is controlled to be on. Each safety calculator may use any method to detect a failure in the corresponding output switch. For example, the first safety calculator may detect a failure in the second output switch using information transmitted from the second safety calculator, and the second safety calculator may detect a failure in the first output switch using information transmitted from the second safety calculator.

A control apparatus according to still another aspect of the present invention is an apparatus for controlling an on-off state of power to a control target. The apparatus includes an output terminal connectable to the control target, a power disconnect switch that connects and disconnects between a power supply for the control target and an internal power supply, a normal calculator that outputs, in response to an input of a normal command carrying an instruction to supply power to the control target under normal control, a normal control signal to control the power disconnect switch to be on, and outputs, in response to an input of the normal command carrying an instruction to stop power supply to the control target under the normal control, the normal control signal to control the power disconnect switch to be off, a first output switch and a second output switch each connected to the output terminal and the internal power supply to form a current path to allow a current to flow from the internal power supply to the control target in response to the first output switch and the second output switch being on, a first safety calculator that outputs, in accordance with a safety control command, a first safety control signal to control an on-off state of the first output switch and detects a failure in the second output switch, and a second safety calculator that outputs, in accordance with the safety control command, a second safety control signal to control an on-off state of the second output switch and detects a failure in the first output switch. In response to the power disconnect switch being controlled to be on, the first safety calculator operates in a first safety control state to monitor the second output switch for a failure and enters, upon detecting a failure in the second output switch, a first resetting state in which the first safety calculator continues to output the first safety control signal to control the first output switch to be off until a predetermined resetting operation is performed on the control apparatus. In response to the power disconnect switch being controlled to be off, the first safety calculator operates in a first normal control state of being unable to detect a failure in the second output switch or being unable to enter the first resetting state in response to a failure detected in the second output switch. In response to the power disconnect switch being controlled to be on, the second safety calculator operates in a second safety control state to monitor the first output switch for a failure and enters, upon detecting a failure in the first output switch, a second resetting state in which the second safety calculator continues to output the second safety control signal to control the second output switch to be off until the predetermined resetting operation is performed. In response to the power disconnect switch being controlled to be off, the second safety calculator operates in a second normal control state of being unable to detect a failure in the first output switch or being unable to enter the second resetting state in response to a failure detected in the first output switch.

The control apparatus can thus perform both safety control and normal control over a control target connected to the output terminal.

Advantageous Effects

The electromagnetic brake controller and the control apparatus according to the above aspects of the present invention can perform both safety control and normal control over an electromagnetic brake and a control target connected to an output terminal.

DETAILED DESCRIPTION

Embodiments of the present invention will now be described with reference to the drawings.

First Embodiment

Figure 2:
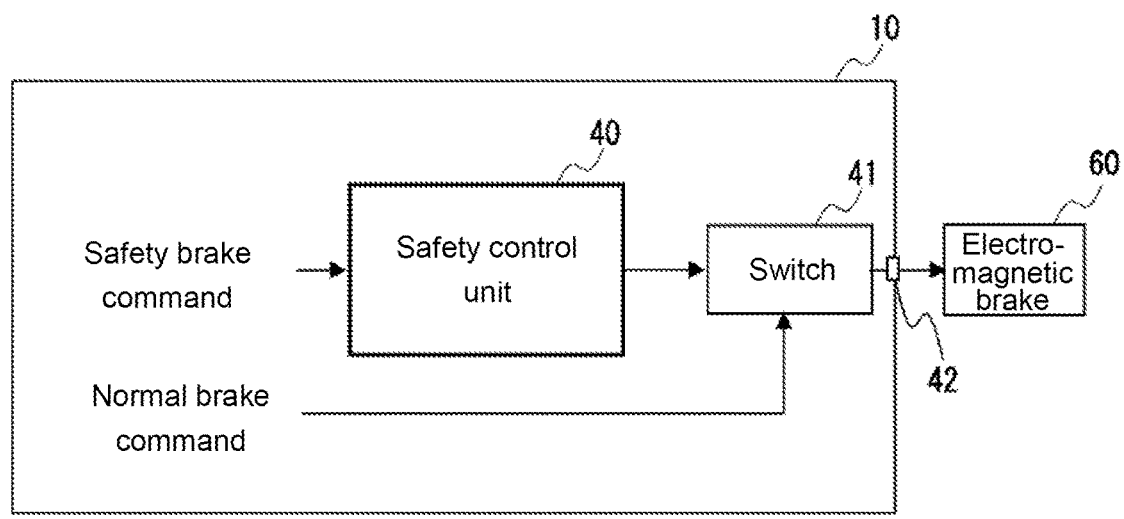
FIG. 2 is a schematic diagram of an electromagnetic brake controller according to a first embodiment of the present invention.

FIG. 2 is a schematic diagram of an electromagnetic brake controller 10 according to a first embodiment of the present invention.

The electromagnetic brake controller 10 according to the present embodiment is incorporated in a servo driver to control a negative-actuated electromagnetic brake 60. As illustrated, the electromagnetic brake controller 10 includes a safety control unit 40, a switch 41, and an output terminal 42.

The output terminal 42 is connectable to the electromagnetic brake 60 controllable by the electromagnetic brake controller 10. The switch 41 (e.g., a relay) provides an output (hereafter, a brake control signal) from the safety control unit 40 to the electromagnetic brake 60 in response to a normal brake command indicating ON, and stops providing the brake control signal to the electromagnetic brake 60 in response to a normal brake command indicating OFF. The brake command (normal brake command or safety brake command) indicating ON (high-level command signal), as described above or below, carries an instruction to release the electromagnetic brake 60. The brake command indicating OFF (low-level command signal) carries an instruction to apply the electromagnetic brake 60.

Figure 1:
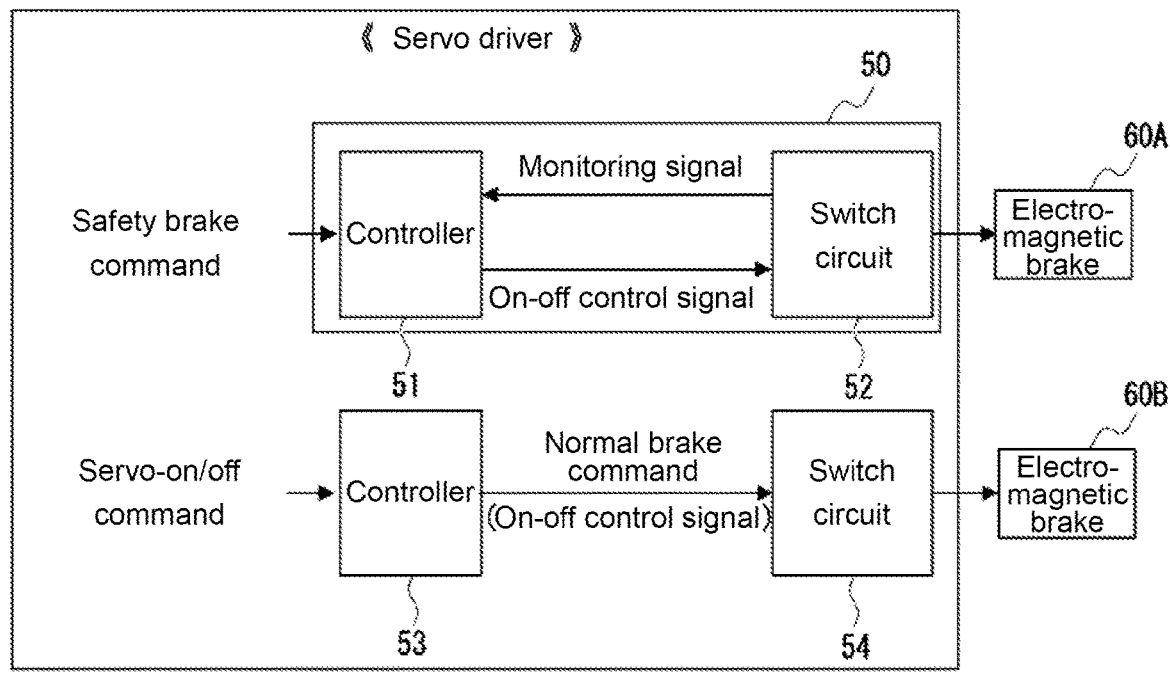
FIG. 1 a diagram describing control over an electromagnetic brake performed by a known servo driver.

The safety control unit 40 outputs a brake control signal that is an on-off control signal for starting or stopping the electromagnetic brake 60 in accordance with the safety brake command. The safety control unit 40 has the same function as a known unit that outputs a brake control signal in accordance with a safety brake command (e.g., the safety control unit 50 in FIG. 1).

As described above, the electromagnetic brake controller 10 according to the present embodiment includes a section including the safety control unit 40 and the switch 41 (hereafter, a brake control section). The brake control section outputs a brake control signal for releasing the electromagnetic brake 60 in response to both a normal brake command and a safety brake command indicating ON, and outputs a brake control signal for applying the electromagnetic brake 60 in response to at least either a normal brake command or a safety brake command indicating OFF. The electromagnetic brake controller 10 allows a brake control signal from the brake control section to be provided to the electromagnetic brake 60 through the output terminal 42.

The electromagnetic brake controller 10 according to the present embodiment can thus perform both safety control and normal control over the electromagnetic brake 60 connected to the output terminal 42. This structure has fewer connection targets than the known structure for electromagnetic brake control (FIG. 1), and thus involves fewer maintenance man-hours.

Second Embodiment

In the electromagnetic brake controller 10 according to the first embodiment, the safety control unit 40 may have the self-diagnosis malfunctioning when the switch 41 is controlled using a normal brake command. The malfunctioning of the self-diagnosis refers to determining (diagnosing) a failure in the self-diagnosis. An electromagnetic brake controller 10 according to a second embodiment of the present invention is modified from the electromagnetic brake controller 10 according to the first embodiment to prevent the self-diagnosis from malfunctioning.

Figure 3:
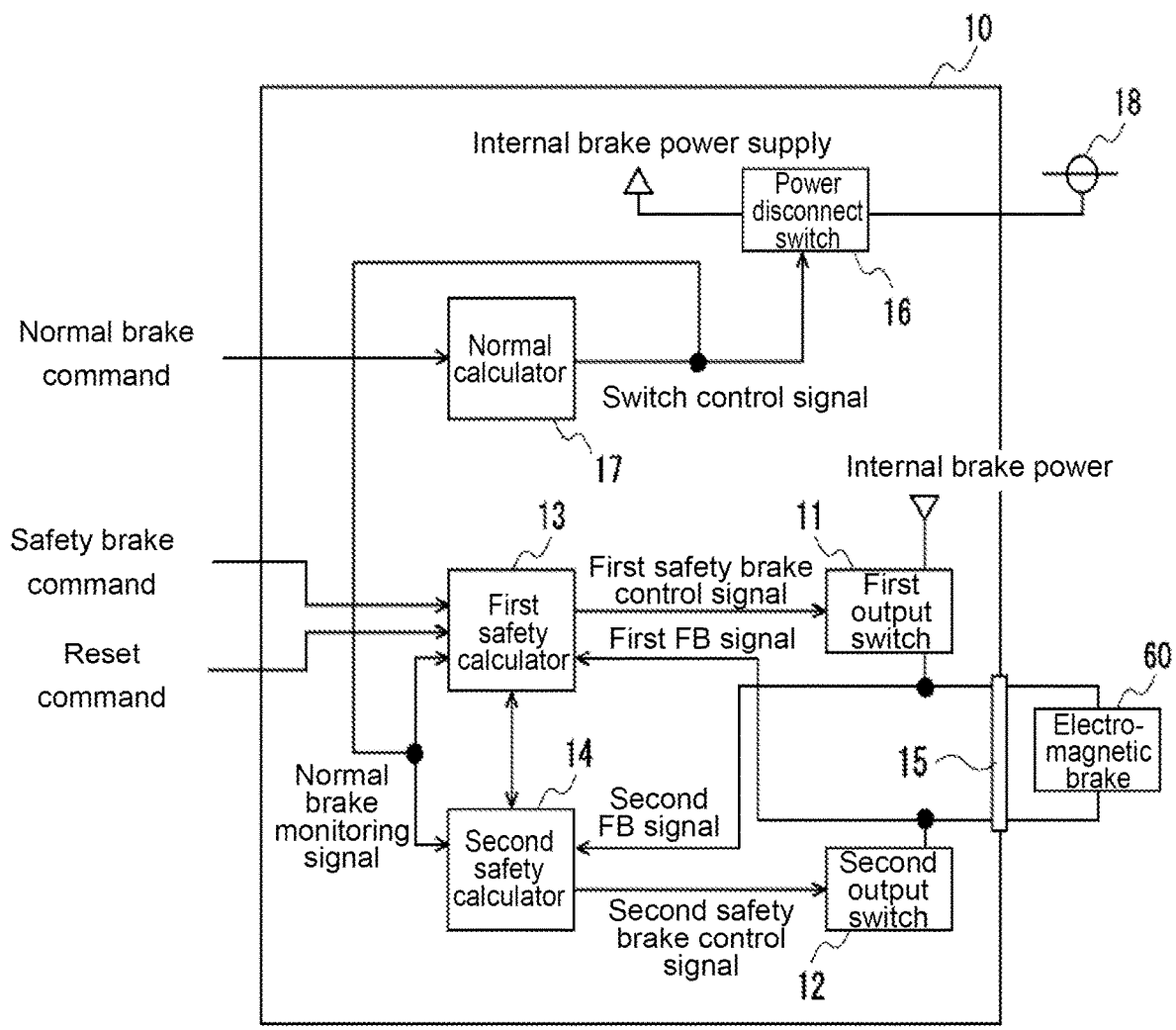
FIG. 3 is a schematic diagram of an electromagnetic brake controller according to a second embodiment of the present invention.

FIG. 3 is a schematic diagram of the electromagnetic brake controller 10 according to the second embodiment.

As illustrated, the electromagnetic brake controller 10 according to the present embodiment includes a first output switch 11, a second output switch 12, a first safety calculator 13, a second safety calculator 14, an output terminal 15, a power disconnect switch 16, and a normal calculator 17.

The output terminal 15 is connectable to an electromagnetic brake 60 controllable by the electromagnetic brake controller 10. The power disconnect switch 16 is turned on and off to connect or disconnect between a power-supply unit 18 and an internal brake power supply (internal brake power-supply line). The power-supply unit 18 serves as a power supply for the electromagnetic brake 60 connected to the output terminal 15. The power disconnect switch 16, the first output switch 11, and the second output switch 12 are typically relays or semiconductor switches.

The normal calculator 17 outputs a switch control signal at a level corresponding to a normal brake command for controlling the on-off state of the power disconnect switch 16. In response to a normal brake command indicating ON, the normal calculator 17 outputs a switch control signal for turning off the power disconnect switch 16. Each of the normal calculator 17, the first safety calculator 13, and the second safety calculator 14 includes, for example, a unit including a processor and peripheral elements or a microcontroller. A normal brake command causes the electromagnetic brake 60 to be applied or released under normal control (by simply controlling the on-off state of power).

The first output switch 11 and the second output switch 12 are used to supply a current (power) from the internal brake power supply to the electromagnetic brake 60 connected to the output terminal 15. The first output switch 11 and the second output switch 12 are each connected to the output terminal 15 and to the internal brake power supply to form a current path for a current to flow from the internal brake power supply to the electromagnetic brake 60 in response to both the first output switch 11 and the second output switch 12 being on.

The first safety calculator 13 and the second safety calculator 14 have the functions described below.

In response to a high-level normal brake monitoring signal (switch control signal) (or in response to the power disconnect switch 16 being on), the first safety calculator 13 outputs a first safety brake control signal at a level corresponding to an input safety brake command to control the on-off state of the first output switch 11. In response to a high-level normal brake monitoring signal, the second safety calculator 14 outputs a second safety brake control signal at a level corresponding to a safety brake command transmitted from the second safety calculator 14 to control the on-off state of the first output switch 11. The first and second safety calculators 13 and 14 can turn on the first and second output switches 11 and 12 in accordance with a safety brake command when each component is determined to be in a normal state through the processing that starts in response to an input reset command.

When changing the level of a first safety brake control signal, the first safety calculator 13 transmits a notification of the state (level) of the first safety brake control signal to the second safety calculator 14. Upon receiving the notification of the state of the first safety brake control signal, the second safety calculator 14 compares the state of the first safety brake control signal with the state of a second feedback signal (second FB signal) detected by the second safety calculator 14 to determine whether the first output switch 11 has a failure.

When changing the level of a second safety brake control signal, the second safety calculator 14 transmits a notification of the state of the second safety brake control signal to the first safety calculator 13. Upon receiving the notification of the state of the second safety brake control signal, the first safety calculator 13 compares the state of the second safety brake control signal with the state of a first feedback signal (first FB signal) detected by the first safety calculator 13 to determine whether the second output switch 12 has a failure.

In response to any failure determined in the second output switch 12, the first safety calculator 13 transmits a notification of the failure to the second safety calculator 14, and enters a resetting state in which the first safety calculator 13 continues to output the first safety brake control signal for controlling the first output switch 11 to be off until each component is determined to be in a normal state through the processing that starts in response to an input reset command. The first safety calculator 13 also enters the resetting state in response to a notification of a failure in the first output switch 11.

Similarly, in response to any failure determined in the first output switch 11 or in response to a notification of a failure in the first output switch 11, the second safety calculator 14 enters the resetting state in which the second safety calculator 14 continues to output the second safety brake control signal for controlling the first output switch 11 to be off until each component is determined to be in a normal state through the processing that starts in response to an input reset command.

The first safety calculator 13 in the electromagnetic brake controller 10 is designed (programmed) to operate in a state of being unable to detect a failure in the second output switch 12 in response to a low-level normal brake monitoring signal (or in response to the power disconnect switch 16 being off). Similarly, the second safety calculator 14 in the electromagnetic brake controller 10 is designed to operate in a state of being unable to detect a failure in the first output switch 11 in response to a low-level normal brake monitoring signal.

In other words, basically in response to a normal brake command for applying the electromagnetic brake 60 under normal control, the electromagnetic brake controller 10 electrically disconnects the internal brake power supply from the power-supply unit 18 to apply the electromagnetic brake 60 (disconnect power to the electromagnetic brake 60). However, with the internal brake power supply electrically disconnected from the power-supply unit 18, the second feedback signal indicates that the first output switch 11 is off although the first safety brake control signal indicates that the first output switch 11 is on, and the first feedback signal indicates that the first output switch 11 is off although the second safety brake control signal indicates that the second output switch 12 is on.

Thus, with the internal brake power supply electrically disconnected from the power-supply unit 18, the first safety calculator 13 and the second safety calculator 14 having their failure detection function enabled each enter the resetting state and are unable to receive an instruction carried by the normal brake command. With the first and second safety calculators 13 and 14 having their failure detection function disabled, the electromagnetic brake controller 10 can release the electromagnetic brake 60 by reconnecting the internal brake power supply to the power-supply unit 18. Thus, the electromagnetic brake controller 10 has the structure described above.

Figure 4A:
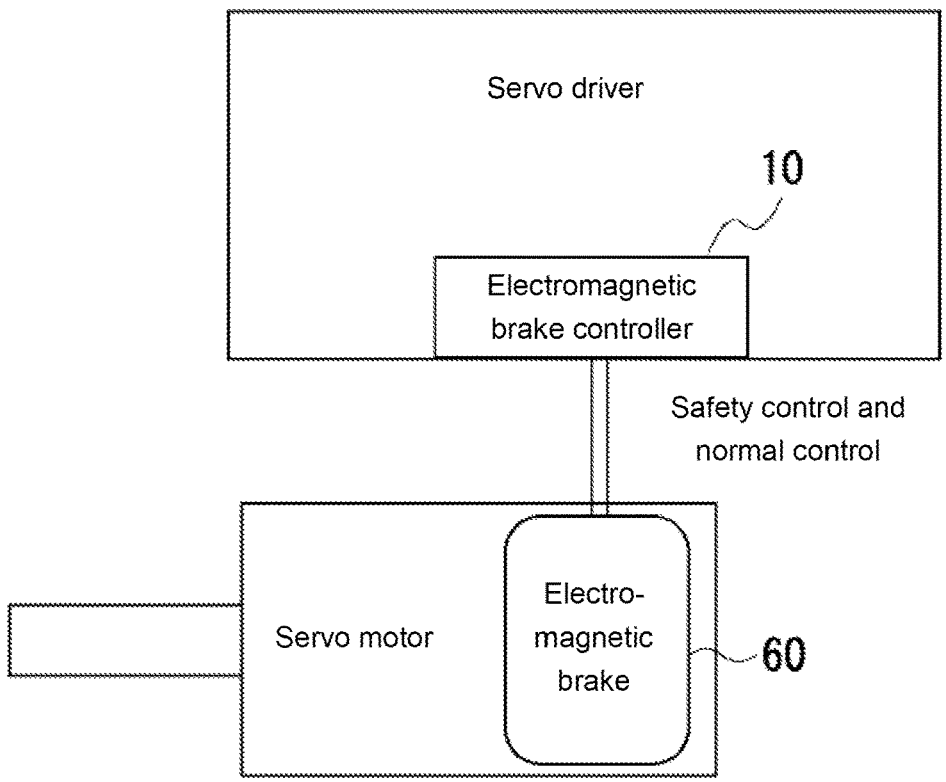
FIGS. 4A and 4B are diagrams describing example uses of the electromagnetic brake controller according to the second embodiment.
Figure 4B:
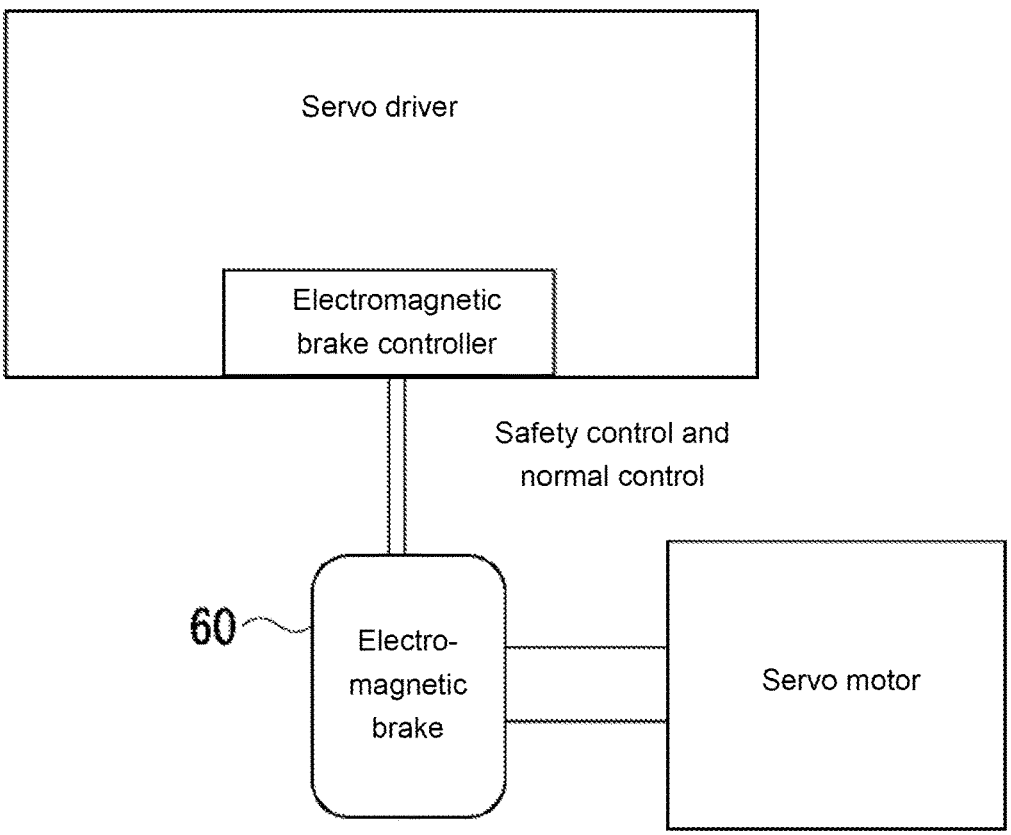

As described above, the electromagnetic brake controller 10 can perform both safety control and normal control over the electromagnetic brake 60 connected to the output terminal 15. As shown in FIGS. 4A and 4B, the electromagnetic brake controller 10 can thus perform intended control over the electromagnetic brake 60 installed in a servo motor (FIG. 4A) and the electromagnetic brake 60 installed outside a servo motor (FIG. 4B). The electromagnetic brake controller 10 can also change control over the electromagnetic brake 60 in accordance with the details of the control over the servo motor.

Modifications

The electromagnetic brake controller 10 according to the above embodiments may be modified variously.

For example, the first safety calculator 13 and the second safety calculator 14 in the electromagnetic brake controller 10 according to the second embodiment may be modified to determine whether the power disconnect switch 16 is on based on the voltage of the internal brake power supply. The electromagnetic brake controller 10 may include a first output switch 11 that outputs a low-level second feedback signal in response to the power disconnect switch 16 being on and a second output switch 12 that outputs a low-level first feedback signal in response to the power disconnect switch 16 being on to allow the first safety calculator 13 and the second safety calculator 14 to determine whether each of the second output switch 12 and the first output switch 11 has any failure based on these feedback signals.

In another modification, the first safety calculator 13 and the second safety calculator 14 detecting a failure in the second and first output switches 12 and 11 in response to a low-level normal brake monitor signal do not enter the resetting state.

The brake control section (components other than the output terminal 15) in the electromagnetic brake controller 10 according to the second embodiment may have a structure different from the structure described above and may include a diagnosis function to determine whether the brake control section is in the normal state, a safety control function to output a brake control signal in accordance with the safety brake command, which may output, in response to the diagnosis function determining the brake controller not being in the normal state, a brake control signal for applying the electromagnetic brake, and a normal control function to output a brake control signal in accordance with the normal brake command. For example, the electromagnetic brake controller 10 (FIG. 3) may eliminate the power disconnect switch 16 and the normal calculator 17 and have the power-supply unit 18 directly connected to the internal brake power supply (first output switch 11) to allow the first safety calculator 13 and the second safety calculator 14 to control the first and second output switches 11 and 12 in accordance with a normal brake command without detecting a failure in the first and second output switches 11 and 12.

Figure 5:
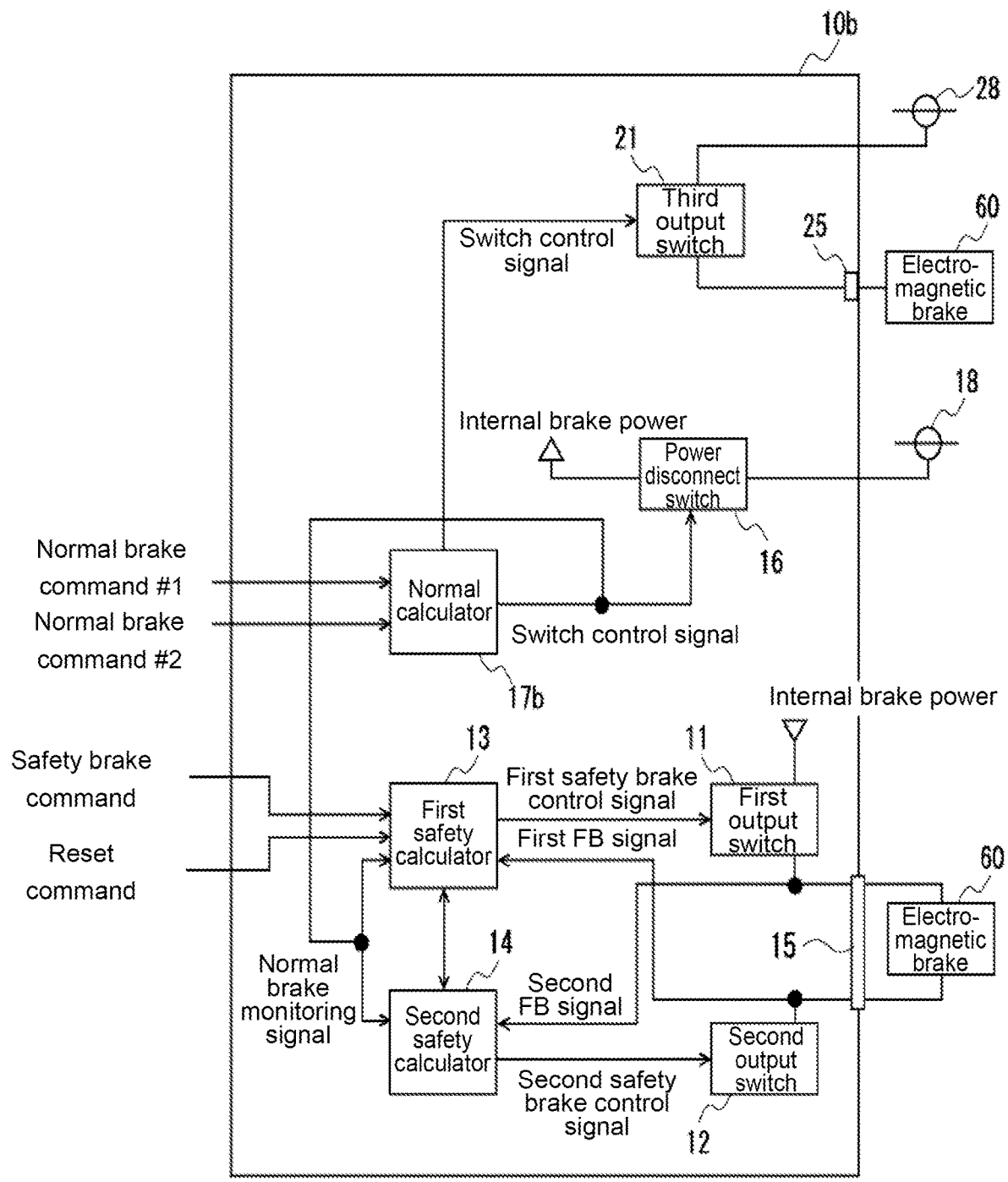
FIG. 5 is a schematic diagram of an electromagnetic brake controller according to a modification of the second embodiment.

The electromagnetic brake controller 10 according to the first or second embodiment may be modified to include N 2) such units having the above structure that can perform safety control and normal control over N electromagnetic brakes 60. In another modification, the electromagnetic brake controller 10 according to the second embodiment may be modified to be an electromagnetic brake controller 10b with the structure shown in FIG. 5. More specifically, the electromagnetic brake controller 10b may perform safety control and normal control over an electromagnetic brake 60 connected to an output terminal 15, and simply perform normal control over an electromagnetic brake 60 connected to an output terminal 25. The electromagnetic brake controller 10b includes a third output switch 21 for turning on and off the power from a power-supply unit 28 to the electromagnetic brake 60. A normal calculator 17b turns on or off the power disconnect switch 16 in accordance with a normal brake command #1 and turns on and off the third output switch 21 in accordance with a normal brake command #2.

A control apparatus with the technique described above may be implemented (manufactured) for controlling a device such as a machine tool, other than the electromagnetic brake 60.

Appendix 1

An electromagnetic brake controller (10) for controlling a negative-actuated electromagnetic brake (60), the controller (10) comprising:
  an output terminal (42) connectable to the electromagnetic brake (60); and
  a brake control section (40, 41) configured to output, through the output terminal, a brake control signal to be provided to the electromagnetic brake, the brake control section being configured to output a brake control signal for releasing the electromagnetic brake in response to a normal brake command and a safety brake command both indicating ON and to output a brake control signal for applying the electromagnetic brake in response to at least one of the normal brake command or the safety brake command indicating OFF.

Appendix 2

An electromagnetic brake controller (10) for controlling a negative-actuated electromagnetic brake (50), the controller (10) comprising:
  an output terminal (15) connectable to the electromagnetic brake;
  a brake power disconnect switch (15) configured to connect and disconnect between a power supply for the electromagnetic brake connected to the output terminal and an internal brake power supply;
  a normal calculator (16) configured to output, in response to a normal brake command indicating ON, a normal brake control signal to control the brake power disconnect switch (15) to be on, and output, in response to the normal brake command indicating OFF, the normal brake control signal to control the brake power disconnect switch (15) to be off;
  a first output switch (11) and a second output switch (12) each connected to the output terminal and the internal brake power supply to form a current path to allow a current to flow from the internal brake power supply to the electromagnetic brake in response to the first output switch (11) and the second output switch (12) being on;
  a first safety calculator (13) configured to output, in accordance with a safety brake command, a first safety brake control signal to control an on-off state of the first output switch (11), and to detect a failure in the second output switch (12); and
  a second safety calculator (14) configured to output, in accordance with the safety brake command, a second safety brake control signal to control an on-off state of the second output switch (12), and to detect a failure in the first output switch (11),
  wherein in response to the brake power disconnect switch (13) being controlled to be on, the first safety calculator (13) operates in a first safety control state to monitor the second output switch (12) for a failure and enters, upon detecting a failure in the second output switch (12), a first resetting state in which the first safety calculator (13) continues to output the first safety brake control signal to control the first output switch (11) to be off until a predetermined resetting operation is performed on the electromagnetic brake controller (10), and in response to the brake power disconnect switch (16) being controlled to be off, the first safety calculator (13) operates in a first normal control state of being unable to detect a failure in the second output switch (12) or being unable to enter the first resetting state in response to a failure detected in the second output switch (12), and
  in response to the brake power disconnect switch (16) being controlled to be on, the second safety calculator (14) operates in a second safety control state to monitor the first output switch (11) for a failure and enters, upon detecting a failure in the first output switch (11), a second resetting state in which the second safety calculator (14) continues to output the second safety brake control signal to control the second output switch (12) to be off until the predetermined resetting operation is performed, and in response to the brake power disconnect switch (16) being controlled to be off, the second safety calculator (14) operates in a second normal control state of being unable to detect a failure in the first output switch (11) or being unable to enter the second resetting state in response to a failure detected in the first output switch (11).

Appendix 3

A control apparatus (10) for controlling an on-off state of power to a control target, the apparatus (10) comprising:
  an output terminal (15) connectable to the control target;
  a power disconnect switch (15) configured to connect and disconnect between a power supply for the control target and an internal power supply;
  a normal calculator (16) configured to output, in response to an input of a normal command carrying an instruction to supply power to the control target under normal control, a normal control signal to control the power disconnect switch (15) to be on, and output, in response to an input of the normal command carrying an instruction to stop power supply to the control target under the normal control, the normal control signal to control the power disconnect switch (15) to be off;
  a first output switch (11) and a second output switch (12) each connected to the output terminal (15) and the internal power supply to form a current path to allow a current to flow from the internal power supply to the control target in response to the first output switch (11) and the second output switch (12) being on;
  a first safety calculator (13) configured to output, in accordance with a safety control command, a first safety control signal to control an on-off state of the first output switch (11), and to detect a failure in the second output switch (12); and
  a second safety calculator (14) configured to output, in accordance with the safety control command, a second safety control signal to control an on-off state of the second output switch (12), and to detect a failure in the first output switch (11),
  wherein in response to the power disconnect switch (15) being controlled to be on, the first safety calculator (13) operates in a first safety control state to monitor the second output switch (12) for a failure and enters, upon detecting a failure in the second output switch (12), a first resetting state in which the first safety calculator (13) continues to output the first safety control signal to control the first output switch (11) to be off until a predetermined resetting operation is performed on the control apparatus, and in response to the power disconnect switch (15) being controlled to be off, the first safety calculator (13) operates in a first normal control state of being unable to detect a failure in the second output switch (12) or being unable to enter the first resetting state in response to a failure detected in the second output switch (12), and in response to the power disconnect switch (15) being controlled to be on, the second safety calculator (14) operates in a second safety control state to monitor the first output switch (11) for a failure and enters, upon detecting a failure in the first output switch (11), a second resetting state in which the second safety calculator (14) continues to output the second safety control signal to control the second output switch (12) to be off until the predetermined resetting operation is performed, and in response to the power disconnect switch (15) being controlled to be off, the second safety calculator (14) operates in a second normal control state of being unable to detect a failure in the first output switch (11) or being unable to enter the second resetting state in response to a failure detected in the first output switch (11).

DESCRIPTION OF SYMBOLS 10,10a electromagnetic brake controller
11 first output switch
12 second output switch
13 first safety calculator
14 second safety calculator
15, 25, 42 output terminal
16 power disconnect switch
17, 17b normal calculator
18, 28 power-supply unit
21 third output switch
40 safety control unit
41 switch
60 electromagnetic brake

The invention claimed is:

1. An electromagnetic brake controller for controlling a negative-actuated electromagnetic brake, the controller comprising:
an output terminal connectable to the electromagnetic brake;
a brake power disconnect switch configured to connect and disconnect between a power supply for the electromagnetic brake connected to the output terminal and an internal brake power supply;
a normal calculator configured to output, in response to a normal brake command indicating ON, a normal brake control signal to control the brake power disconnect switch to be on, and output, in response to the normal brake command indicating OFF, the normal brake control signal to control the brake power disconnect switch to be off;
a first output switch and a second output switch each connected to the output terminal and the internal brake power supply to form a current path to allow a current to flow from the internal brake power supply to the electromagnetic brake in response to the first output switch and the second output switch being on;
a first safety calculator configured to output, in accordance with a safety brake command, a first safety brake control signal to control an on-off state of the first output switch, and to detect a failure in the second output switch; and
a second safety calculator configured to output, in accordance with the safety brake command, a second safety brake control signal to control an on-off state of the second output switch, and to detect a failure in the first output switch,
wherein in response to the brake power disconnect switch being controlled to be on, the first safety calculator operates in a first safety control state to monitor the second output switch for the failure in the second output switch and enters, upon detecting the failure in the second output switch, a first resetting state in which the first safety calculator continues to output the first safety brake control signal to control the first output switch to be off until a predetermined resetting operation is performed on the electromagnetic brake controller, and in response to the brake power disconnect switch being controlled to be off, the first safety calculator operates in a first normal control state of being unable to detect the failure in the second output switch or being unable to enter the first resetting state in response to detecting the failure detected in the second output switch, and in response to the brake power disconnect switch being controlled to be on, the second safety calculator operates in a second safety control state to monitor the first output switch for a the failure in the first output switch and enters, upon detecting the failure in the first output switch, a second resetting state in which the second safety calculator continues to output the second safety brake control signal to control the second output switch to be off until the predetermined resetting operation is performed, and in response to the brake power disconnect switch being controlled to be off, the second safety calculator operates in a second normal control state of being unable to detect the failure in the first output switch or being unable to enter the second resetting state in response to detecting the failure detected in the first output switch.

2. The electromagnetic brake controller according to claim 1, wherein
the first safety calculator and the second safety calculator each determine, based on the normal brake control signal, whether the brake power disconnect switch is controlled to be on.

3. The electromagnetic brake controller according to claim 1, wherein
the first safety calculator detects the failure in the second output switch using information transmitted from the second safety calculator, and
the second safety calculator detects the failure in the first output switch using information transmitted from the first safety calculator.

4. A control apparatus for controlling an on-off state of power to a control target, the apparatus comprising:
an output terminal connectable to the control target;
a power disconnect switch configured to connect and disconnect between a power supply for the control target and an internal power supply;
a normal calculator configured to output, in response to an input of a normal command carrying an instruction to supply power to the control target under normal control, a normal control signal to control the power disconnect switch to be on, and output, in response to an input of the normal command carrying an instruction to stop power supply to the control target under the normal control, the normal control signal to control the power disconnect switch to be off;

a first output switch and a second output switch each connected to the output terminal and the internal power supply to form a current path to allow a current to flow from the internal power supply to the control target in response to the first output switch and the second output switch being on;

a first safety calculator configured to output, in accordance with a safety control command, a first safety control signal to control an on-off state of the first output switch, and to detect a failure in the second output switch; and a second safety calculator configured to output, in accordance with the safety control command, a second safety control signal to control an on-off state of the second output switch, and to detect a failure in the first output switch, wherein in response to the power disconnect switch being controlled to be on, the first safety calculator operates in a first safety control state to monitor the second output switch for the failure in the second output switch and enters, upon detecting the failure in the second output switch, a first resetting state in which the first safety calculator continues to output the first safety control signal to control the first output switch to be off until a predetermined resetting operation is performed on the control apparatus, and in response to the power disconnect switch being controlled to be off, the first safety calculator operates in a first normal control state of being unable to detect the failure in the second output switch or being unable to enter the first resetting state in response to detecting the failure detected in the second output switch, and in response to the power disconnect switch being controlled to be on, the second safety calculator operates in a second safety control state to monitor the first output switch for the failure in the first output switch and enters, upon detecting the failure in the first output switch, a second resetting state in which the second safety calculator continues to output the second safety control signal to control the second output switch to be off until the predetermined resetting operation is performed, and in response to the power disconnect switch being controlled to be off, the second safety calculator operates in a second normal control state of being unable to detect the failure in the first output switch or being unable to enter the second resetting state in response to detecting the failure detected in the first output switch.

* * * * *

UNITED STATES PATENT AND TRADEMARK OFFICE
CERTIFICATE OF CORRECTION

PATENT NO. : 12,294,327 B2
APPLICATION NO. : 17/285658
DATED : May 6, 2025
INVENTOR(S) : Takao Uemura, Ryuichi Jimbo and Masakazu Matsugami It is certified that error appears in the above-identified patent and that said Letters Patent is hereby corrected as shown below:

In the Claims

In Claim 1, Column 12, Line 31, the word "a" should be deleted.

Signed and Sealed this
Twenty-second Day of July, 2025

Coke Morgan Stewart
*Acting Director of the United States Patent and Trademark Office*